United States Patent [19]

Kostun

[11] Patent Number: 4,790,864
[45] Date of Patent: Dec. 13, 1988

[54] COMPACT ENGINE AIR/CLEANER WITH INTEGRATED COMPONENTS

[75] Inventor: John D. Kostun, Brighton, Mich.
[73] Assignee: Ford Motor Company, Dearborn, Mich.
[21] Appl. No.: 133,835
[22] Filed: Dec. 16, 1987
[51] Int. Cl.$^4$ .............................................. B01D 19/00
[52] U.S. Cl. ........................................ 55/276; 55/418; 55/497; 55/502; 123/198 E; 181/229
[58] Field of Search ................ 55/276, 497, 418, 510, 55/502; 123/198 E; 181/229

[56] References Cited

U.S. PATENT DOCUMENTS

| | | | |
|---|---|---|---|
| 2,954,096 | 9/1960 | McMullen | 181/229 |
| 4,425,145 | 1/1984 | Reese | 55/497 |
| 4,713,097 | 12/1987 | Grawi et al. | 55/276 |

FOREIGN PATENT DOCUMENTS

| | | | |
|---|---|---|---|
| 533262 | 9/1955 | Italy | 181/229 |
| 97758 | 1/1940 | Sweden | 181/229 |

*Primary Examiner*—Bernard Nozick
*Attorney, Agent, or Firm*—Robert E. McCollum; Clifford L. Sadler

[57] ABSTRACT

A compact combination engine air cleaner/noise deadener for installation in the engine compartment of a motor vehicle type engine includes a two piece plastic elongated housing that is compact and has an ambient air inlet at one end radially spaced from an air outlet to the engine located on the axis of the housing, the inlet containing a first noise attenuating venturi, the housing having an air filter at the other end connected to the venturi and discharging air into a second convergent-divergent flow control noise attenuating venturi with which is integrated a mass air flow sensor, the venturis being surrounded by a dead air space type resonating chamber that has an inlet concentric with the air outlet so that engine feedback noises and sound waves are trapped in the chamber and dissipated, and any sound waves passing serially into the venturis bounce off the walls of the venturi diffusers to also be dissipated, thus minimizing the transmission of engine feedback noises past the air cleaner.

5 Claims, 3 Drawing Sheets

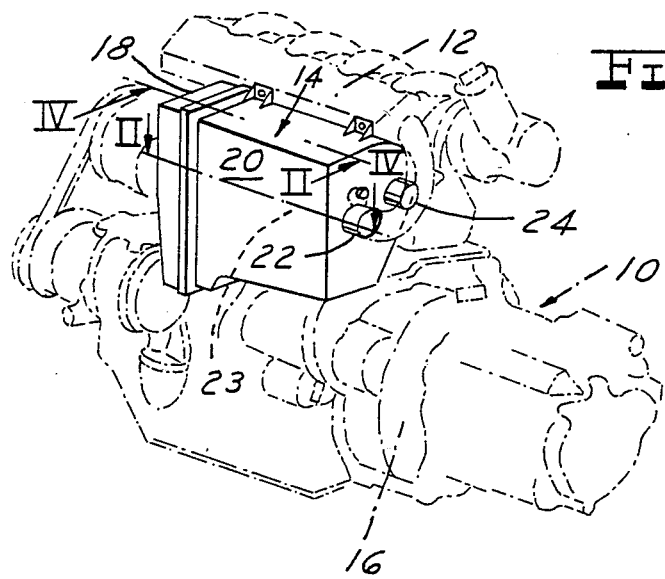
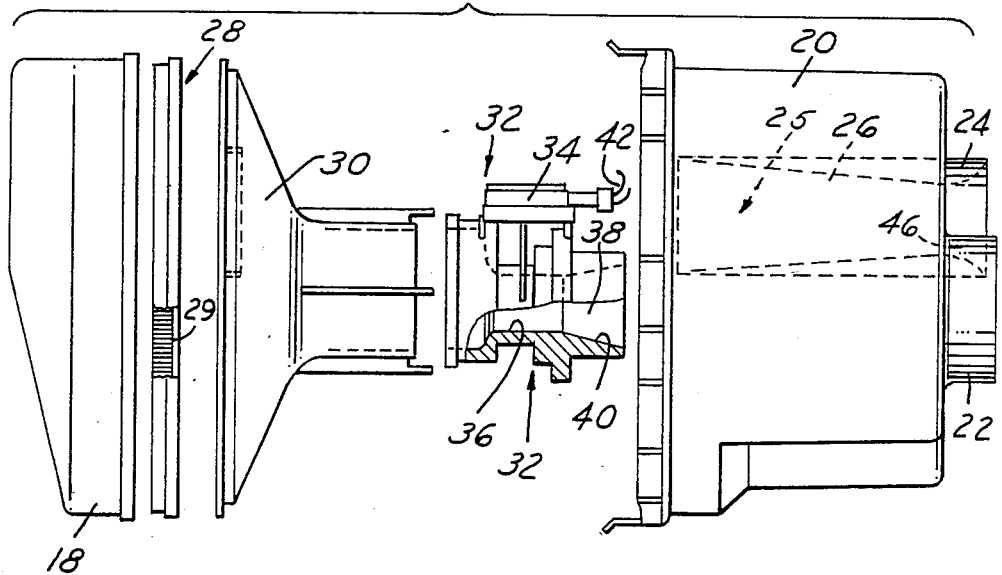

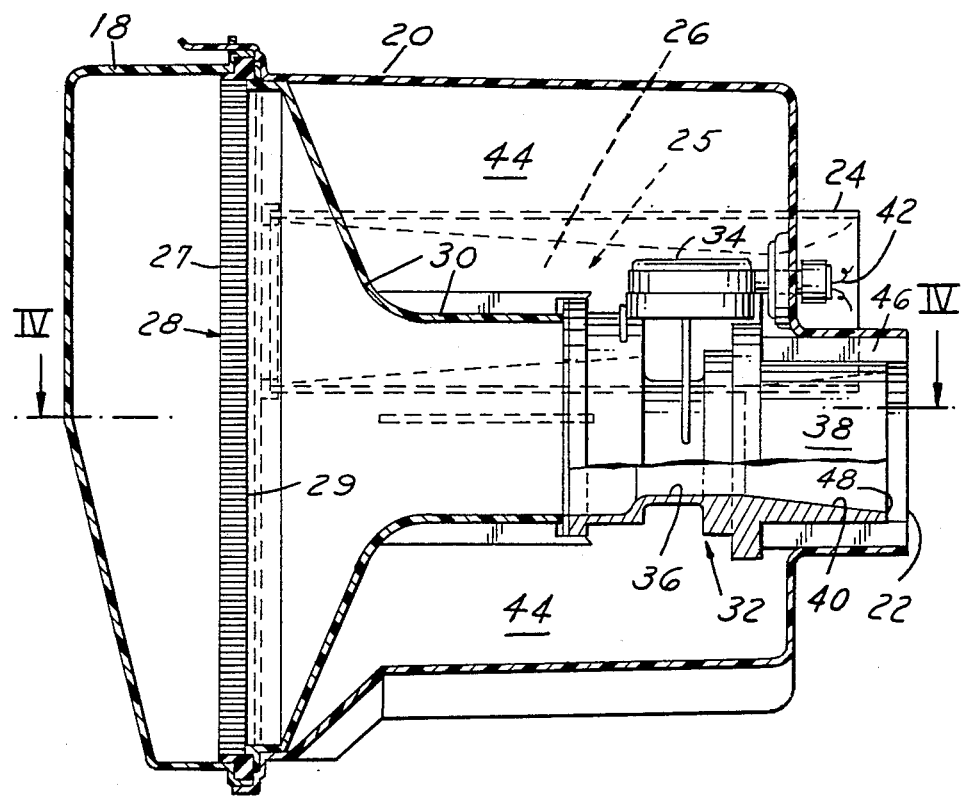

COMPACT ENGINE AIR/CLEANER WITH INTEGRATED COMPONENTS

This invention relates in general to a combination air cleaner/noise silencer for an automotive type internal combustion engine. More particularly, it relates to one that is compact in size with components that are axially aligned and intggrated into a unitary assembly.

The invention is an improvement on the invention shown and described in U.S. Ser. No. 019,990 now U.S. Pat. No. 4,713,097 issued 12/15/87, Grawi et al, INTEGRATED ENGINE AIR CLEANER AND VENTURI RESONATOR, assigned to the Assignee of this invention. The invention provides all of the advantages described in the latter application and further enhances these features by providing an integrated structure in a comPact assembly that is more suitable for installation in vehicles having low hood lines.

U.S. Ser. No. 019,990, now U.S. Pat. No. 4,713,097 issued 12/15/87, shows a combination air cleaner/noise silencer having upper and lower portions. The lower portion contains an air inlet and an air filter element from which clean air is supplied to the upper portion and to a chamber leading to the inlet of a venturi that extends at right angles to the chamber. Concentric with the venturi is a dead air space type resonating chamber having an inlet concentric with the outlet of the diffuser of the venturi. This results in engine induction noise feedback either being dissipated in the resonating chamber or captured in the diffuser portion of the venturi to be deflected by the tapering diffuser walls back into the engine proper.

It will be clear that the construction just described, with upper and lower portions and parts projecting at right angles to each other, provides a somewhat bulky arrangement which results in a more difficult and less efficient installation into the engine compartment of a motor vehicle than would a more compact and unitary assembly.

The invention to be described is just such an assembly. It consists of a fewness of parts all contained within a relatively compact unitary housing that can be located in different attitudes in the engine compartment. It, therefore, is more suitable for installation than prior art constructions considered.

Combination engine air cleaner/noise silencers are known. For example, U.S. Pat. No. 2,783,855, Karn et al, shows in FIG. 1 such a combination consisting of an inlet for flow of fresh air through a filter element into the inlet of a tubular member of constant diameter for passage therefrom into the engine proper, holes in the tubular element communicating the air with a dead air space 66 constituting a resonating chamber. The tube 49 is straight in this case and, therefore, causes a nonrecoverable pressure loss. It also transmits noise back to the inlet.

The invention to be described includes a number of serially connected venturis each having a small throat and an efficient diffuser to provide excellent flow characteristics and pressure recovery, and, there- fore, efficient operation, and each further either attenuating or trapping and dissipating noise emanating from the engine or reflecting the same off the tapering walls of its diffuser back into the engine proper.

The use of a venturi in connection with engine inlets for silencing noises also is known. For example, U.S. Pat No. 1,578,682, Raymond, shows in FIG. 2 such a venturi, as does Moyer in U.S. Pat. No. 2,943,683, in FIG. 2, Schonberger et al, U.S. Pat No. 3,998.614, in FIG. 8, and Hoffman, U.S. Pat No. 2,869,670. These references, however, show merely an isolated use of a venturi, per se, and do not show a combination air cleaner/silencer of the construction of the invention.

The invention is directed to an air cleaner/sound attenuator assembly that includes a compact elongated housing having an air inlet and outlet at one end, an upright filter at the opposite end to which the air inlet is connected through the housing by an elongated sound attenuating first venturi, the clean air outlet side of the filter being connected to the inlet of a second venturi that not only controls air flow but also is an efficient pressure loss recovery device and controls noise, the outlet of the second venturi being connected to the air induction system of the engine, the second venturi being integrated with and defined by a mass air flow sensor, and a resonating chamber surrounding a portion of the latter venturi and having an inlet concentric with the air outlet of the second venturi for further absorbing or dissipating engine induction feedback noises and sound waves, all of the components being axially or coaxially aligned within the housing and contiguous to one another to form a compact integrated air cleaner/sound attenuator unit that is easy to assemble and disassemble and occupies little space within a housing.

It is, therefore, a primary object of the invention to provide a combination air cleaner/noise attenuating device that consists essentially of a compact hollow housing that contains an air filter supplying clean air from a first venturi to a second venturi that is connected to the inlet to the engine induction system, and a dead air space type resonating chamber for absorbing engine induction feedback noises, the components all being integrated together to form a unitary assembly and a compact structure, all enclosed by the housing.

Other objects, features and advantages of the invention will become more apparent upon reference to the succeeding detailed description thereof, and to the drawings illustrating the preferred embodiments thereof, wherein:

FIG. 1 is a perspective view in phantom of an internal combustion engine embodying the invention shown in solid lines;

FIG. 2 is an enlarged exploded view of the combination air cleaner/noise silencer shown in FIG. 1 embodying the invention, with parts broken away and in section;

FIG. 3 is a further enlarged cross-sectional view of the assembled components of the air cleaner shown in FIG. 2.

Figure 4:
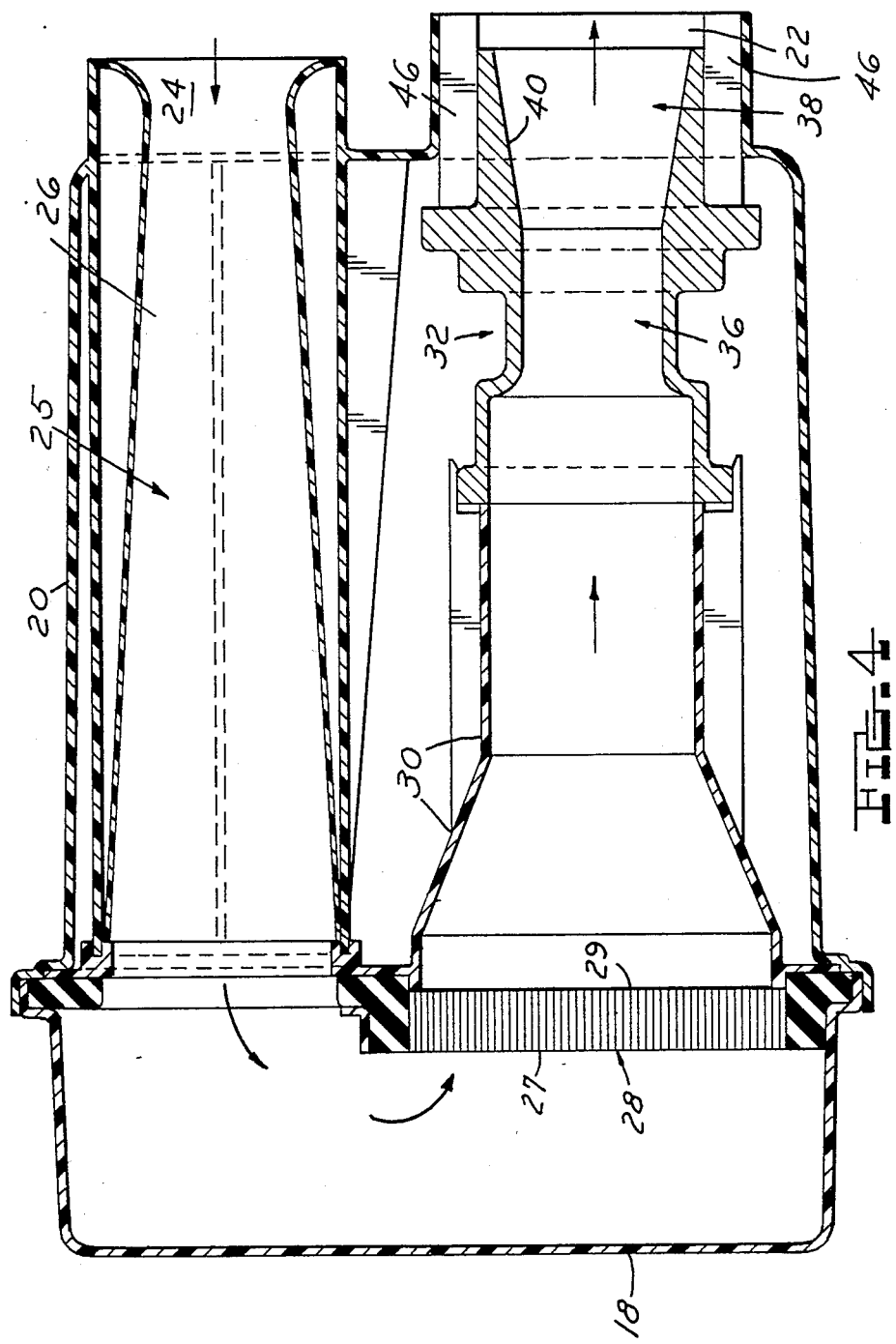
FIG. 4 is an enlarged cross-sectional view taken on a plane and viewed in the direction of the arrows IV—IV of FIG. 3.

In the past, air cleaners generally were the topmost components in the engine compartment of a motor vehicle, usually placed over the inlet to a carburetor. Obviously, this increased the overall height and profile of the vehicle hood. More recently, the air cleaners per se have been located remotely from the induction system of the engine and placed in more convenient locations in the engine compartment, with a zip tube or the like connecting the air cleaner, including its filter element, to the induction system.

As stated previously, however, the remotely located air cleaner installations usually wound up having a number of bulky parts, making assembly more difficult and costly and one that was not easily packaged in shallow engine compartments. For example, some 1987 vehicles require as many as twenty-four parts to the air cleaner assembly.

The invention provides an assembly with only four in-plant parts; i.e., an integrated filter/resonator assembly, a connector to the mass air flow sensor inside the air cleaner assembly, a conduit connected to the outlet of the air cleaner assembly, and a second conduit connected to the intake manifold of the engine. The air cleaner/noise attenuator itself consists simply of a housing in which is located an air inlet noise attenuating venturi, a filter, a mass air flow sensor integrated with a second flow control and noise attenuating venturi, a resonator chamber formed by all the remaining space in the housing, and an air inlet and outlet to the housing.

More specifically, FIG. 1 shows in phantom lines a 4-cylinder in-line engine 10 which in this particular case is slanted at about a 33° angle from the vertical to suit a particular installation. It has an intake manifold 12 for supplying air or an air/fuel mixture to the engine. The air cleaner/noise attenuator of the invention is indicated in general in solid lines at 14. It is nestled to the side of the engine next to the intake manifold, which results in opening up the area over the transaxle 16 to provide good cooling performance for reducing underhood engine temperatures. As will be seen, the air cleaner assembly 14 presents the appearance of a compact cartridge-like unit in which, as will be described, are integrated all of the necessary components.

More particularly, as best seen in FIGS. 2, 3 and 4, as well as FIG. 1, the assembly includes a two-piece plastic housing 18, 20 defining an elongated, flat-like unit 14. The housing defines a closed hollow container or shell, the main body portion 20 having a clean air outlet 22 at the front of the unit on the longitudinal axis 23 of the housing, and an ambient air inlet or air horn 24 (see FIG. 3) located on the side.

The air inlet 24 is essentially the bell-shaped converging portion of an efficient convergent-divergent sound attenuating venturi 25. It has the usual throat section of minimum cross-sectional area connected to an elongated efficient diffuser section 26 that provides ideal pressure recovery. The latter extends essentially parallel to the housing axis 23, and passes within housing portion 20 from the one or front end to the other or rear end of the unit defined by housing portion 18. There, the air passage is intercepted by one at right angles to it that extends across the back of the unit and vertically, as seen in FIGS. 3 and 4, between the end of housing portion 18 and the face 27 of a right angulated air filter 28. The latter is axially mounted in an upright position on the longitudinal axis 23 of the housing to extend at right angles to it for a maximum axial flow of ambient air through it from one side to the other in the direction of outlet 22.

The clean air side 29 of filter 28 discharges air into the rectangular converging portion 30 of a second convergent-divergent type venturi indicated as a whole at 32. A portion of it is formed as part of a mass air flow sensor 34. The venturi 32 includes the convergent portion 30 connected to an annular throat section 36 of minimum cross-sectional area that discharges the air flow into an efficient conical diffuser 38 of gradually increasing cross-sectional area defined by tapering walls 40.

The mass air flow sensor 34 is adapted to be connected by suitable wiring 42 to a part of the electronic engine control system, not shown, that automatically controls the fuel supply system to the engine in response to signals from various sensors. As will be clear from the drawings, the throat and diffuser sections 36 and 38 of the venturi are axially aligned with the convergent portion 30 and the clean air outlet tube 22 emanating from the housing.

The entire annular space 44 in housing 20 that is not occupied by the components described, i.e., venturi 32, the walls of housing portion 20, filter 28, and venturi 25, defines a dead air type resonator chamber 44. The latter is closed, i.e., sealed, at its end contiguous with filter 28. It has an annular inlet 46 at the front or opposite end of the chamber that is concentric with the exit edge 48 of the diffuser and radially spaced from it. The annulus and diffuser are both connected to the clean air outlet tube 22 shown in FIG. 1.

Venturi 25 acts primarily as a sound attenuator while venturi 32 acts both as a flow control and a noise attenuator. However, both of their diffuser portions 26 and 38 also act to recover velocity energy, thereby minimizing pressure loss through the system and thereby increasing operating efficiency. The resonator chamber 44 absorbs or dissipates engine induction noise feedback that travels in pulses or waves from the engine back through connector tube 22 into annulus 46. The waves ricochet or are reflected against the walls of the chamber to be broken up, dissipated and absorbed. A portion of the noises or sound waves will pass into diffuser 38 of venturi 32, where they are bounced or reflected off the slanting or tapering walls 40 of the diffuser to bombard one another and be dampened or dissipated, thereby minimizing the transmission of noise from the engine back into the engine compartment. Any further leakage of sound waves back towards th inlet 24 are further trapped by venturi 25 and reflected off the walls of diffuser 26 to be cancelled.

The operation is believed to be clear from the previous description and a consideration of the drawings and, therefore, will not be given in detail. Suffice it to say, however, that ambient air entering the inlet 24 of the housing is accelerated through the throat of venturi 25 to pass back through the diffuser 26, where sound attenuating and efficient pressure recovery is had, to the opposite end of housing portion 18. Here it is turned at right angles to flow across the entire face 27 of filter element 28 and through it to be cleaned for exit into the converging portion 30 of venturi 32. The velocity of the clean air then again is accelerated for passage through throat section 36 where the flow volume is detected by the mass air flow sensor 34. The air then is discharged through diffuser 38 where the flow velocity is reduced and the pressure recovered in an efficient manner. The clean air then flows out discharge tube 22 into the intake manifold 12 of the engine indicated in FIG. 1. Any feedback noises from the induction system traveling in pressure waves back through tube 22 pass into the resonator chamber 44 to be absorbed and dissipated, the remaining wave portions passing into the diffuser 38 where theY also are dissipated or redirected back towards the engine to minimize, if not totally prevent, transmission of noises or sounds from the engine back into the engine compartment of the vehicle. Any further leakage of pressure waves past the filter are trapped and dissipated in the diffuser 26.

Completing the construction, the two sections 18 and 20 of the housing are each formed with mating plastic parts of a releasable quick connect type snap fastener so that they can be joined together in a manner that provides ease of assembly or disassembly quickly and efficiently. This eliminates the need for rigid type connectors, such as bolts, screws, etc., normally found in air cleaner assemblies. The assembly thus provides a compact two-piece housing that is easily separated for removal or installation of the filter element and any other components as necessary.

From the foregoing, it will be seen that the invention provides a relatively simple assembly of a two-piece housing of compact configuration containing a filter element, a pair of flow control and sound deadening venturis, a mass air flow sensor, a resonating chamber, and an air inlet and outlet, all axially or coaxially aligned and serially contiguous to one another essentially on or adjacent the longitudinal axis of the housing to form an integrated, compact assembly having only a few components, and yet one that provides all of the necessary functions of current production air cleaner assemblies having as many as twenty-seven different parts that are not integrated into a compact structure.

It also will be seen that the invention provides an integrated compact air cleaner/sound attenuator for an automotive type engine that is more easily installed in many different locations in the vehicle engine compartment to permit better engine cooling as well as noise attenuating and a more efficient use of the space for other components or accessories of the engine.

While the invention has been shown and described in its preferred embodiment, it will be clear to those skilled in the arts to which it pertains that many changes and modifications may be made thereto without departing from the scope of the invention. For example, the air inlet passage 26 is shown in FIG. 1 located on the side of housing 20. Alternatively, it could be located on top or bottom without departing from the scope of the invention, to make an even more compact and flatter construction. Also, while the assembly is shown in FIG. 1 as being relatively flat, it will be clear that the assembly could also be round, or of other compact shapes.

I claim:

1. A compact engine air cleaner assembly comprising a number of air flow and noise attenuating elements totally contained within a single housing, the housing containing an essentially U-shaped air conduit consisting of first and second parallel air passages arranged in a side by side relationship having end portions adjacent one another, the first passage end portion containing an ambient air inlet extending through the housing for the flow of air into and through the first passage in one direction, the second passage end portion containing an outlet extending through the housing adjacent the first passage inlet for the flow of air through and out of the second passage and housinhg into an engine air inlet in a direction opposite to the direction of flow through the first passage, the U-shaped conduit further including an arcuate connecting base portion constituting an end chamber connecting the passages together for reversing the direction of air flow from the first to the second passage, an air filter located in the chamber and extending across at least one of the passages essentially at right angles thereto for filtering all of the air passing through the conduit, the second passage containing a convergent-divergent venturi coaxially mounted with respect to the second passage downstream of the filter for metering air flow therethrough and attentuating engine noise, an engine noise resonating chamber within the housing coaxial with and surrounding the second passage, and an inlet to the resonating chamber coaxial with and surrounding the second passage outlet and spaced radially therefrom for the passage into the resonating chamber of noises and sound waves emanating from the engine for absorption thereof.

2. An assembly as in claim 1, the first passage containing a convergent-divergent noise attenuating venturi.

3. An assembly as in claim 1, wherein the second passage venturi includes a converging portion connected at one end to the filter and at its other end to a throat of minimum cross-sectional area, the throat being connected to a diffuser of gradually increasing cross-sectional area connected to the outlet, the diffuser having tapering walls for deflecting engine sound waves back towards the engine.

4. An assembly as in claim 3, wherein a mass air flow sensor is integrated as a part of the venturi throat and diffuser sections, the resonating chamber also surrounding and enclosing the first passage.

5. A compact engine air cleaner assembly comprising a number of air flow and noise attenuating elements totally contained within a single housing, the housing containing an air flow conduit doubled back upon itself consisting of first and second parallel air passages arranged in a side by side relationship having end portions adjacent one another, the first passage end portion containing an ambient air inlet extending through the housing for the flow of air into and through the first passage in one direction, the second passage end portion containing an outlet extending through the housing adjacent the first passage inlet for the flow of air through and out of the second passage and housing into an engine air inlet in a direction opposite to the direction of flow through the first passage, the conduit further including an arcuate connecting base portion constituting an end chamber connecting the passages together for reversing the direction of air flow from the first to the second passage, an air filter located in the chamber and extending across at least one of the passages essentially at right angles thereto for filtering all of the air passing through the conduit, the second passage containing a convergent-divergent venturi coaxially mounted with respect to the second passage downstream of the filter for metering air flow therethrough and attenuating engine noise, an engine noise resonating chamber within the housing coaxial with and surrounding the second passage, and an inlet to the resonating chamber coaxial with and surrounding the second passage outlet and spaced radially therefrom for the passage into the resonating chamber of noises and sound waves emanating from the engine for absorption thereof.

* * * * *